United States Patent [19]
Fox

[11] Patent Number: 5,858,912
[45] Date of Patent: Jan. 12, 1999

[54] NON-AQUEOUS LIQUIDS FOR MOISTENING AN OXIDE-BEARING CARRIER IN SULFUR SWEETENING

[75] Inventor: Richard B. Fox, Wildwood, Mo.

[73] Assignee: The SulfaTreat Company, Chesterfield, Mo.

[21] Appl. No.: 832,572

[22] Filed: Apr. 2, 1997

[51] Int. Cl.$^6$ ............... B01J 37/02; B01J 37/025
[52] U.S. Cl. ............... 502/439; 502/80; 502/84; 502/338; 502/506; 502/514; 502/517; 423/244.1
[58] Field of Search ............ 423/244.1; 502/80, 502/84, 87, 406, 506, 514, 439, 338, 517

[56] References Cited

U.S. PATENT DOCUMENTS

| | | | |
|---|---|---|---|
| 4,113,606 | 9/1978 | Mulaskey | 208/244 |
| 4,163,043 | 7/1979 | Dezael et al. | 423/234 |
| 4,251,495 | 2/1981 | Deschamps et al. | 423/230 |
| 4,310,497 | 1/1982 | Deschamps et al. | 423/230 |
| 4,455,286 | 6/1984 | Young et al. | 423/230 |
| 4,550,098 | 10/1985 | Gens | 502/324 |
| 4,593,148 | 6/1986 | Johnson et al. | 585/823 |
| 4,690,806 | 9/1987 | Schorfheide | 423/230 |
| 4,695,366 | 9/1987 | Miller et al. | 208/91 |
| 4,722,799 | 2/1988 | Ashbrook et al. | 210/722 |
| 4,729,889 | 3/1988 | Flytani-Stephanopoulos et al. | 423/593 |
| 4,871,710 | 10/1989 | Denny et al. | 502/414 |
| 4,939,113 | 7/1990 | Tauster et al. | 502/251 |
| 4,983,367 | 1/1991 | Denny et al. | 423/244 |
| 4,990,318 | 2/1991 | Kidd | 423/230 |
| 4,996,181 | 2/1991 | Denny et al. | 502/414 |
| 5,147,620 | 9/1992 | Rozsa | 423/224 |
| 5,227,351 | 7/1993 | Gasper-Galvin et al. | 502/60 |
| 5,244,641 | 9/1993 | Khare | 423/220 |
| 5,320,992 | 6/1994 | Fox et al. | 502/84 |
| 5,447,551 | 9/1995 | Huestis et al. | 75/414 |
| 5,472,633 | 12/1995 | Griffin, Jr. et al. | 252/189 |
| 5,478,541 | 12/1995 | Samuels et al. | 423/220 |
| 5,632,931 | 5/1997 | Fox et al. | 252/378 R |

FOREIGN PATENT DOCUMENTS

| | | |
|---|---|---|
| 791411 | 11/1978 | U.S.S.R. |
| WO9014876 | 12/1990 | WIPO |

OTHER PUBLICATIONS

Kohl et al. *Gas Purification* 4th Edition, Gulf Publishing Co., Houston TX USA, pp. 582–594, ISBN 0–87201–314–6, 1985 No Month.

*Primary Examiner*—Gary P. Straub
*Assistant Examiner*—Timothy C. Vanoy
*Attorney, Agent, or Firm*—Haverstock, Garrett & Roberts

[57] ABSTRACT

The present invention relates to the use of a non-aqueous liquid such as phenols, glycols, aromatic hydrocarbons, diesel fuel, kerosene, and mixtures thereof as a moistening agent in a packed bed process, wherein the packed bed contains a composition for removing sulfur compounds from fluid streams, the composition containing a carrier composition, an iron oxide composition, and a non-aqueous liquid moistening agent. The non-aqueous liquid moistening agent is used in place of water and thus avoids the problems associated with using water as a moistening agent.

2 Claims, No Drawings

NON-AQUEOUS LIQUIDS FOR MOISTENING AN OXIDE-BEARING CARRIER IN SULFUR SWEETENING

CROSS-REFERENCE TO RELATED APPLICATIONS

This application is related to application Ser. No. 08/518,645, filed Aug. 24, 1995, now U.S. Pat. No. 5,362,391, issued May 27, 1997, which was a continuation-in-part of application Ser. No. 08/253,976, filed on Jun. 3, 1994, abandoned, which was a continuation-in-part of application Ser. No. 08/069,073, filed May 28, 1993, now U.S. Pat. No. 5,320,992, issued Jun. 14, 1994, which is a continuation-in-part of application Ser. No. 07/878,031, filed May 4, 1992, now U.S. Pat. No. 5,264,194, issued Nov. 23, 1993.

BACKGROUND OF THE INVENTION

1. Field of the Invention

This invention relates to a composition, and a method for preparing the composition, for use in packed beds designed to scavenge and remove sulfur compounds found in hydrocarbon fluids, with the composition made from the combination of carrier particles, oxide particles, and non-aqueous liquid moistening agents. More specifically, the present invention relates to the use of non-aqueous liquid moistening agents in moistening oxide-bearing carrier particles.

2. Description of the Related Art

The use of water moistened carriers with iron oxide particles were disclosed in U.S. Pat. No. 5,320,992, which issued on Jun. 14, 1994. Oxide particles are used in reactor beds to remove sulfur compounds and sweeten hydrocarbon fluids, such as gasoline. Typically the oxide particles are mixed with a carrier composition, so that the composition used to sweeten the gas is a combination of carrier and oxide particles.

In order to have a process wherein oxide particles efficiently remove sulfur compounds from gasoline, it is necessary for the oxide particles to remain spaced apart from one another. A moistening agent is used to hold the oxide particles onto the carrier particles, so that the oxide particles will remain spaced apart. If a moistening agent is not used the oxide particles will flow through the reactor bed with the gasoline and clump together, which is undesirable because clumping decreases the uniform permeability and porosity of the reactor bed. Additionally, the clumping of the oxide particles will result in decreased contact between the oxide particles and the hydrocarbon fluids, resulting in a lesser amount of sulfur being reacted and an increased likelihood that the hydrocarbon fluids will remain contaminated. It has been known to moisten the oxide-bearing carrier particles with water so as to allow the oxide particles to adhere to the carrier particles found in a reactor bed. However, the use of water alone as a moistening agent suffers from a number of disadvantages.

One disadvantage associated with water, is that it will migrate into the hydrocarbon fluids, including gasoline, being treated in the present process, known as the packed bed process. This is disadvantageous because commercial providers of, for instance, gasoline can sell fluids with only a very limited amount of water present in the gasoline. In fact, if too much water migrates into the gasoline, then the gasoline must be treated to remove the water that migrated into the gasoline. Another disadvantage associated with the use of water is that the water used to moisten the carrier particles can contaminate the hydrocarbon fluid being sweetened. Essentially water is considered a contaminant that must be removed before the gasoline can be sold. The migration of water into the gasoline is especially undesirable because the gasoline must be passed through an additional processing step to remove the water, which can be costly and potentially raises the price of the gasoline. As can be seen, the use of water as a moistening agent is undesirable because it readily migrates into hydrocarbon fluids being treated in a packed bed process and because once the water migrates into the hydrocarbon fluids it is considered a contaminant that must be removed.

Thus, it is desirable to have a moistening agent available for moistening oxide-bearing carrier particles that is not considered a contaminant of hydrocarbon fluids and that does not readily migrate into the hydrocarbon fluids being treated. Specifically, it is desirable that water alone is not used as a moistening agent in the packed bed process.

SUMMARY OF THE INVENTION

The present invention relates to the use of non-aqueous liquids as moistening agents in a packed bed process, where the packed bed contains a composition comprised of carrier particles oxide particles, and non-aqueous moistening agents. The non-aqueous liquid moistening agents are used in place of water to moisten carrier particles so as to allow for the adherence of oxide particles to the carrier particles. Use of the non-aqueous liquids as moistening agents is advantageous because the non-aqueous liquids do not readily migrate into the hydrocarbon fluids being treated in the packed bed process. Even if some of the non-aqueous liquids migrate into the hydrocarbon fluids being sweetened, the non-aqueous liquids are not considered contaminants and therefore do not have to be removed by a separate process. It should be pointed out that when removing sulfur from hydrocarbon fluids, contamination occurs when the treated hydrocarbon fluid has to be further processed to remove impurities that entered the hydrocarbon fluid when it was passed through the packed bed process. Regardless of the non-aqueous liquid moistening agent selected, the moistening agent must be capable of holding an oxide particle in contact with a carrier particle, not contaminating the hydrocarbon fluids, and not solubilizing either the carrier particles or the oxide particles. Thus, non-aqueous liquids are the preferred moistening agents and are used in place of water to cause the oxide particles to adhere to the carrier particles. Suitable non-aqueous liquids are alcohols, glycols, aromatic hydrocarbons, aliphatic hydrocarbons, and mixtures thereof.

The carrier particles generally used in the present composition and method can be selected from a variety of inert materials, which are typically porous and non-reactive with sulfur compounds. The carrier particles must further be capable of being used in a packed bed process and must be insoluble in non-aqueous liquids. Additionally, the carrier particles cannot inhibit the reactivity of the oxide particles which are reactive with sulfur compounds. Examples of the carrier particles that can be used are calcined montmorillonite and bloated shale.

A variety of oxide particles can be used in the present invention as long as the oxide particles can be used in a packed bed process and are reactive with, and result in the removal of, sulfur compounds found in hydrocarbon fluids. The preferred oxide particles are iron oxide particles, with the iron oxide particles preferably being a mix of crystalline phase $Fe_3O_4$ and amorphous $Fe_2O_3$.

DESCRIPTION OF THE PREFERRED EMBODIMENT

The present invention provides a disposable composition for use in a packed bed process designed to remove sulfur compounds from hydrocarbon fluids, with the composition comprised of carrier particles, oxide particles, and non-aqueous liquid moistening agents. Specifically, the present invention relates to the use of non-aqueous liquid moistening agents to moisten carrier particles. Use of the non-aqueous liquid moistening agents is crucial to the present invention, as the non-aqueous liquid moistening agents hold the oxide particles on the carrier particles without contaminating the hydrocarbon fluid being treated in the packed bed process. By holding the oxide particles on the carrier particles the moistening agent sufficiently isolates the oxide particles from one another thereby avoiding clumping of the oxide particles.

The composition used in the packed bed process is comprised of carrier particles, non-aqueous liquid moistening agents, and oxide particles, with the formation of the composition initiated by first selecting an inert carrier that can be used in the packed bed process. A suitable inert carrier can be selected from a variety of materials so long as the carrier particles are porous, non-soluble in non-aqueous liquids, readily wetted, and non-reactive with sulfur compounds. Additionally, it is necessary for the carrier particles to be disposed to binding with oxide particles when a moistening agent is added thereto. While a variety of compositions can be used, the most preferred carrier particles are derived from clay and are preferably selected from the group consisting of calcined montmorillonite, bloated shale or slate, and combinations of calcined montmorillonite and bloated shale. The calcined montmorillonite is especially preferred because it is porous, has a strong texture, and the surface area of the calcined montmorillonite includes cracks, pores, and interstices to which the oxide particles may cling. It is necessary that the carrier particles have sufficient surface area and porosity so that the oxide particles can be dispersed over the surface of the carrier particles and prevented from clumping. Also, the calcined montmorillonite is desirable because it is substantially insoluble in non-aqueous liquids, and has the capacity to absorb a sufficient amount of non-aqueous moistening agent to disperse and hold on its surface an amount of oxide particles equal to from about 5% to about 30% of the total weight of the packed bed composition. It is more preferred for the calcined montmorillonite to hold an amount of oxide particles equal to from about 10% to about 25% of the total weight of the packed bed composition. However, the amount of oxide particles held by and added to the carrier particles can be varied based on the reactivity of the oxide particles. Another attribute of the calcined montmorillonite is that it possesses the necessary strength to be used in a packed bed process. Also, the calcined montmorillonite is generally chemically inert to sulfur compounds, including hydrogen sulfide, mercaptans, and the products of reaction thereof.

The amount of carrier particles used in the packed bed process is dependent upon the size and depth of the reactor vessel designed to hold the packed bed composition. Any amount of carrier particles can be added to the reactor vessel so long as the moistened carrier particles are not crushed by their own weight and hydrocarbon fluids are adequately sweetened. Generally, the amount of carrier particles will be equal to between about 40% and about 85% by weight of the weight of the total packed bed composition. If the montmorillonite is used it will typically have a dry weight ranging between about 35 pounds and about 45 pounds per cubic foot of material. When this is the case, the moistened montmorillonite carrier particles intermixed with oxide particles can be added to a reactor vessel, without crushing the mixed compositions in an amount well over five feet deep and, it appears as much as 40 feet deep.

After the inert carrier particles are selected they are placed in a mixing unit. An amount of non-aqueous moistening agent is then added to the carrier particles in the mixing unit. Generally, any non-aqueous liquid moistening agent that binds the oxide particles to the carrier particles, does not solubilize the carrier or oxide particles, and does not readily migrate into and contaminate the hydrocarbon fluids being sweetened may be used in the present invention. As mentioned, the moistening agent is necessary to cause binding between the carrier particles and the oxide particles. While water could be used, it is not preferred because it can contaminate the hydrocarbon fluids. Preferably, the non-aqueous liquids are selected from flowable alcohols, glycols, aromatic hydrocarbons, aliphatic hydrocarbons, and mixtures thereof. The aromatic hydrocarbons include, but are not limited to, napthalenes. The glycols include, but are not limited to, triethylene glycol, ethylene glycol, diethylene glycol, propylene glycol, and isopropyl glycol. The flowable alcohols include, but are not limited to phenols and methanol. The aliphatic hydrocarbons include, but are not limited to, hexane, gasoline, diesel fuel, kerosene and mixtures thereof. The non-aqueous liquid, moistening agent is added to the carrier particles in the mixing unit in an amount equal to from about 5% to about 35% by weight of the packed bed composition. More preferably, the non-aqueous moistening agent is added to the carrier particles in an amount equal to from about 5% to about 25% by weight of the packed bed composition. The amount of moistening agent added is dependent on which specific moistening agent is added, as some moistening agents more readily wet the carrier particles. Also, the amount of moistening agent added may depend on the amount of oxide particles added to the composition. The non-aqueous liquid moistening agent can be added to the mixing unit through a spray nozzle or by other appropriate means capable of resulting in the thorough mixing of the carrier particles and non-aqueous liquid moistening agent.

Once the addition of the liquid moistening agent to the carrier particles is completed, the oxide particles can be added to the mixture of moistening agent and carrier particles in the mixing unit. The oxide particles can be added at any point after the time when the oxide particles will begin to stick to the carrier particles as a result of the addition of the moistening agent. The amount of oxide particles added to the moistened carrier particles will equal between about 5% and about 30% by weight of the packed bed composition. Also, a sufficient amount of oxide must be added so that the amount of oxide clinging to the carrier particles appears to be equal to at least 6 pounds of oxide particles per cubic foot of carrier particles and probably at least 15 pounds of oxide particles per cubic foot of the calcined and wetted carrier particles. Preferably, the quantity of oxide particles added in the mixing chamber will equal about 15 pounds of oxide particles per cubic foot of carrier particles, but in shallow beds the oxide quantity may be as great as 35 pounds of oxide particles per cubic foot of carrier particles. Oxide particles, and preferably iron oxide particles, are added to the composition because the oxide particles react with sulfur compounds found in hydrocarbon fluids and result in the removal of the sulfur compounds from the hydrocarbon fluids. The iron oxide particles are typically used because of their high rate of reactivity with sulfur compounds. The preferred oxide particles are selected from the group consisting of iron oxide particles, which includes amorphous iron oxide $Fe_2O_3$, crystalline phase iron oxide $Fe_3O_4$, hydrated ferric oxide $Fe_2O_3(H_2O)_x$, and combinations thereof.

Once the three constituents, the oxide particles, the carrier particles, and the non-aqueous liquid moistening agents, have been mixed for a sufficient amount of time to allow binding between the oxide particles and the carrier particles, the composition is ready for use in a packed bed process. Advantageously, the composition can be used immediately, or can be stored for a period of time for later use. The completed composition for use in a packed bed process will contain the constituents in the following amounts:

| | |
|---|---|
| Inert support granules | from about 40% to about 85% by weight of the total composition |
| reactive iron oxide | from about 5% to about 30% by weight of the total composition |
| moistening agent | from about 5% to about 35% by weight of the total composition |
| | Total 100% |

The optimum chamber for mixing the composition should be of a size sufficient to hold at least 16,000 pounds of the composition; however, the chamber can be used to mix much smaller amounts of the composition, for example 500 pounds.

The hydrocarbon fluids that can be treated with the present inventive composition include gasoline and natural gas and can include liquids, gases, and mixtures of liquids and gases. The sulfur compounds removed by the composition include, but are not limited to, hydrogen sulfide and mercaptans.

EXAMPLE 1

A composition for removing hydrogen sulfide and mercaptans from gasoline was prepared by selecting 10,000 pounds of calcined montmorillonite to be used as inert carrier particles. The montmorillonite was calcined at a temperature of about 1200° F. and had a particle size ranging between 4 mesh and 30 mesh, with no more than about 3% of the particles being of a size that passed through a 30 mesh screen. The mesh screen was a J & H vibrating screen. Its dry weight was between 35 pounds and 45 pounds per cubic foot. A quantity of this material was placed in a 13 cubic yard rotary mixer, which was a concrete mixer, and rotated at a speed ranging between about 6 revolutions per minute and about 7 revolutions per minute, while 3585 pounds of moistening agent, triethylene glycol, were sprayed into the mixer, to assure thorough moistening. This was done slowly, over a period of about one half hour. Then 3600 pounds oxide particles were slowly added while the mixing continued for approximately one hour. The moistening agent caused the oxide particles to adhere to the surface and interstices of the carrier particles, in such a manner as to avoid the clumping of the oxide particles. Upon completion of the steps the composition was ready to be used in a reactor bed to remove sulfur from hydrocarbon fluids.

| Constituent | % by weight |
|---|---|
| Montmorillonite | 58 |
| Iron Oxide | 21 |
| Non-aqueous Liquid, Methanol | 21 |
| | 100 |

Thus, there has been shown and described a novel method and composition for activating oxides reactant with sulfur compounds to remove sulfur compounds from fluids which fulfill all the objects and advantages sought therefore. It would be apparent to those skilled in the art, however, that many changes, variation, modification, and other uses and applications for the subject method and composition are possible, and also such changes, variations, modifications, and other uses and applications which do not depart from the spirit and scope of the invention are deemed to be covered by the invention which is limited only by the claims which follow.

What is claimed is:

1. A method for preparing a disposable oxide carrier composition for use in a bed for scavenging sulfur compounds from hydrocarbon fluids, which prevents contamination of the hydrocarbon fluids, wherein said method includes the steps of:

selecting inert carrier particles in an amount equal to between about 40% and about 85% by weight of said oxide carrier composition, said carrier particles having a crush strength sufficient to bear an overlaying bed of said carrier particles at least five feet deep, said carrier particles being further characterized by substantial insolubility in water, chemical inertness to sulfur compounds, and a surface area sufficient to afford dispersion on the surface area of each cubic foot thereof of at least six pounds of iron oxide capable of reacting with hydrogen sulfide and mercaptans;

placing said carrier particles in a mixing chamber;

adding to said carrier particles in the mixing chamber an amount of a non-aqueous liquid moistening agent equal to from about 5% to about 35% by weight of said oxide carrier composition, with said non-aqueous liquid moistening agent not contaminating the hydrocarbon fluids and selected from the group consisting of flowable alcohols, glycols, aromatic hydrocarbons, aliphatic hydrocarbons, and mixtures thereof;

adding iron oxide particles to said non-aqueous liquid moistening agent and said carrier particles, said iron oxide particles being added in an amount equal to from about 5% to about 30% by weight of said oxide carrier compositions and being reactive with sulfur compounds found in hydrocarbon fluids; and removing said oxide carrier composition from the mixing chamber and placing in a reactive bed for use in hydrocarbon fluid sweetening.

2. A disposable oxide carrier composition for scavenging sulfur compounds from hydrocarbon fluids, which prevents contamination of the hydrocarbon fluid being sweetened, said composition comprised of an inert carrier particles equal to from about 40% to about 85% parts by weight of said composition, with said carrier particles being chemically inert to sulfur compounds and having a sufficient surface area to allow dispersion on the surface area of each cubic foot of said carrier particles of at least six pounds of an oxide reactive with sulfur compounds, an amount of a non-aqueous liquid moistening agent equal to from about 5% to about 35% parts by weight of said composition with said non-aqueous liquid moistening agent selected from the group consisting of flowable phenols, glycols, aromatic hydrocarbons, diesel fuel, kerosene, and mixtures thereof, and an amount of oxide particles equal to from about 5% to about 30% parts by weight of said composition, said oxide particles being comprised of crystalline phase $Fe_3O_4$ and amorphous $Fe_2O_3$.

* * * * *

UNITED STATES PATENT AND TRADEMARK OFFICE
CERTIFICATE OF CORRECTION

PATENT NO.: 5,858,912

DATED: January 12, 1999

INVENTOR(S): Richard B. Fox

It is certified that errors appear in the above-identified patent and that said Letters Patent is hereby corrected as shown below:

Column 2, line 22, "particles" should be -- particles, --.

Column 5, line 55, add the following paragraph -- The optimum mixture contained the constituents as follows: --.

Colomn 6, line 50, after "an" and before "inert" add -- amount of --.

Signed and Sealed this

Sixth Day of April, 1999

Attest:

Q. TODD DICKINSON

*Attesting Officer*           *Acting Commissioner of Patents and Trademarks*